(12) United States Patent
Karaoguz et al.

(10) Patent No.: US 8,994,816 B2
(45) Date of Patent: *Mar. 31, 2015

(54) O/S APPLICATION BASED MULTIPLE DEVICE ACCESS WINDOWING DISPLAY

(75) Inventors: Jeyhan Karaoguz, Irvine, CA (US); James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 910 days.

This patent is subject to a terminal disclaimer.

(21) Appl. No.: 13/195,421

(22) Filed: Aug. 1, 2011

(65) Prior Publication Data

US 2011/0285908 A1  Nov. 24, 2011

Related U.S. Application Data

(63) Continuation of application No. 12/774,482, filed on May 5, 2010, now Pat. No. 7,990,414, which is a continuation of application No. 10/874,680, filed on Jun. 23, 2004, now Pat. No. 7,724,279.

(60) Provisional application No. 60/504,872, filed on Sep. 22, 2003.

(51) Int. Cl.
| | |
|---|---|
| G06F 3/00 | (2006.01) |
| H04N 7/18 | (2006.01) |
| H04N 5/45 | (2011.01) |
| G09G 5/14 | (2006.01) |
| H04N 5/445 | (2011.01) |

(52) U.S. Cl.
CPC .. H04N 5/45 (2013.01); G09G 5/14 (2013.01); H04N 5/44591 (2013.01); G09G 2340/12 (2013.01)
USPC .......................................... 348/135; 715/720

(58) Field of Classification Search
USPC ................... 348/135, 159, 559, 563; 725/114; 345/634, 3.1, 3.3, 519; 715/720
See application file for complete search history.

(56) References Cited

U.S. PATENT DOCUMENTS

| | | |
|---|---|---|
| 4,855,713 A | 8/1989 | Brunius |
| 4,855,813 A | 8/1989 | Russell et al. |
| 5,287,188 A | 2/1994 | Saeger et al. |
| 5,532,714 A | 7/1996 | Knapp et al. |
| 5,794,116 A | 8/1998 | Matsuda et al. |
| 5,801,785 A | 9/1998 | Crump et al. |
| 6,141,003 A | 10/2000 | Chor et al. |
| 6,462,776 B2 | 10/2002 | Hudson |

(Continued)

*Primary Examiner* — Gims Philippe
(74) *Attorney, Agent, or Firm* — Brinks Gilson & Lione

(57) ABSTRACT

A system and method for providing access to a video display for multiple devices. Various aspects of the present invention may comprise receiving, at a video display system, a first video data signal through a first data communication interface and a second video data signal through a second data communication interface. A processor module may process the first and second video data signals to generate video information of first and second display windows in a composite display. For example, the processor module may transform and translate video information to fit display windows. The processor module may, for example, generate an output video signal comprising information of the first window and information of the second window. Such a signal may, for example, be utilized to drive an output display showing the first and second windows. Various aspects may also provide method steps and apparatus for controlling aspects of the displayed windows.

20 Claims, 4 Drawing Sheets

(56) References Cited

U.S. PATENT DOCUMENTS

| | | |
|---|---|---|
| 7,480,864 B2 | 1/2009 | Brook et al. |
| 7,554,510 B1 * | 6/2009 | Grigor et al. ............ 345/3.1 |
| 7,724,279 B2 | 5/2010 | Karaoguz et al. |
| 7,990,414 B2 | 8/2011 | Karaoguz et al. |
| 2002/0005900 A1 | 1/2002 | Hudson |
| 2005/0066066 A1 | 3/2005 | Karaoguz et al. |
| 2005/0066068 A1 | 3/2005 | Karaoguz et al. |
| 2010/0214481 A1 | 8/2010 | Karaoguz et al. |

* cited by examiner

O/S APPLICATION BASED MULTIPLE DEVICE ACCESS WINDOWING DISPLAY

CROSS-REFERENCE TO RELATED APPLICATIONS/INCORPORATION BY REFERENCE

This patent application is a CONTINUATION of U.S. patent application Ser. No. 12/774,482, filed May 5, 2010, now U.S. Pat. No. 7,990,414, which is a CONTINUATION of U.S. patent application Ser. No. 10/874,680, filed Jun. 23, 2004, now U.S. Pat. No. 7,724,279, which claims benefit from and priority to provisional patent application Ser. No. 60/504,872, filed Sep. 22, 2003. The contents of each of the above-identified applications are hereby incorporated herein by reference in their entirety. This patent application is related to U.S patent application Ser. No. 10/885,404, and titled "MULTIPLE DEVICE ACCESS WINDOWING DISPLAY".

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

In a dynamic network environment, video resources and their associated users may generally freely enter and leave the network. In various scenarios, demand for video output display services may exceed the supply for such services.

For example, a user of a handheld computing device may enter a room and desire to utilize a video display resource to view email information. Another user may, for example, desire to utilize the video display resource to display motion picture video information from a DVD player. Still another user may, for example, desire to utilize the video display resource to view a presentation that the user is developing on a laptop computing system. In general, a plurality of users in such a dynamic network environment may desire to view respective information (e.g., textual information, graphical information, static pictorial information, and motion picture information). In various scenarios, for example, the plurality of users may have to compete for limited video output resources.

Further, various devices capable of sourcing video information may operate according to a wide array of communication protocols and utilize various communication media. Accordingly, various video output resources may be capable of communicating with various video source devices and incapable of communicating with various other source devices.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for providing access to a video display for multiple devices. Various aspects of the present invention may comprise receiving a first video data signal through a first data communication interface and a second video data signal through a second data communication interface. The first and second video data signals may correspond to respective first and second video images. The first and second video data signals may, for example, comprise any of a variety of video data signal characteristics (e.g., media, protocol, encoding, modulation, data rate, etc.).

A processor module of the display system (or respective sub-modules thereof) may process the first and second video data signals to form respective first and second display windows in a composite display. The first display window may correspond to the first video image, and the second display window may correspond to the second video image. For example, the processor module may determine respective video data from the first and second video data signals. The processor module may, for example, transform the video data corresponding to the first video image into video information of the first display window. The processor module may, for example, transform the video data corresponding to the second video image into video information of the second display window. Video information of the first and second windows may also, for example, comprise graphics information.

The processor module may, for example, generate a video display signal comprising information of the first display window and information of the second display window. For example, the processor module may combine information of the first display window and information of the second display window into information of a composite display image. Such information may be converted into a video display signal.

The video display signal may then, for example, be communicated to an output display driver. The output display driver may then, for example, drive one or more display devices to present the first and second display windows on the display device(s). Though generally described using two-window examples, various aspects of the present invention are generally extendible to n-window scenarios.

Various aspects of the present invention also may provide for automatic or manual control of various features of the first and second windows. For example, a window control module may interface with a user or a system component to determine various features of the first and second display windows.

These and other advantages, aspects and novel features of the present invention, as well as details of illustrative aspects thereof, will be more fully understood from the following description and drawings.

DETAILED DESCRIPTION OF THE INVENTION

Figure 1:
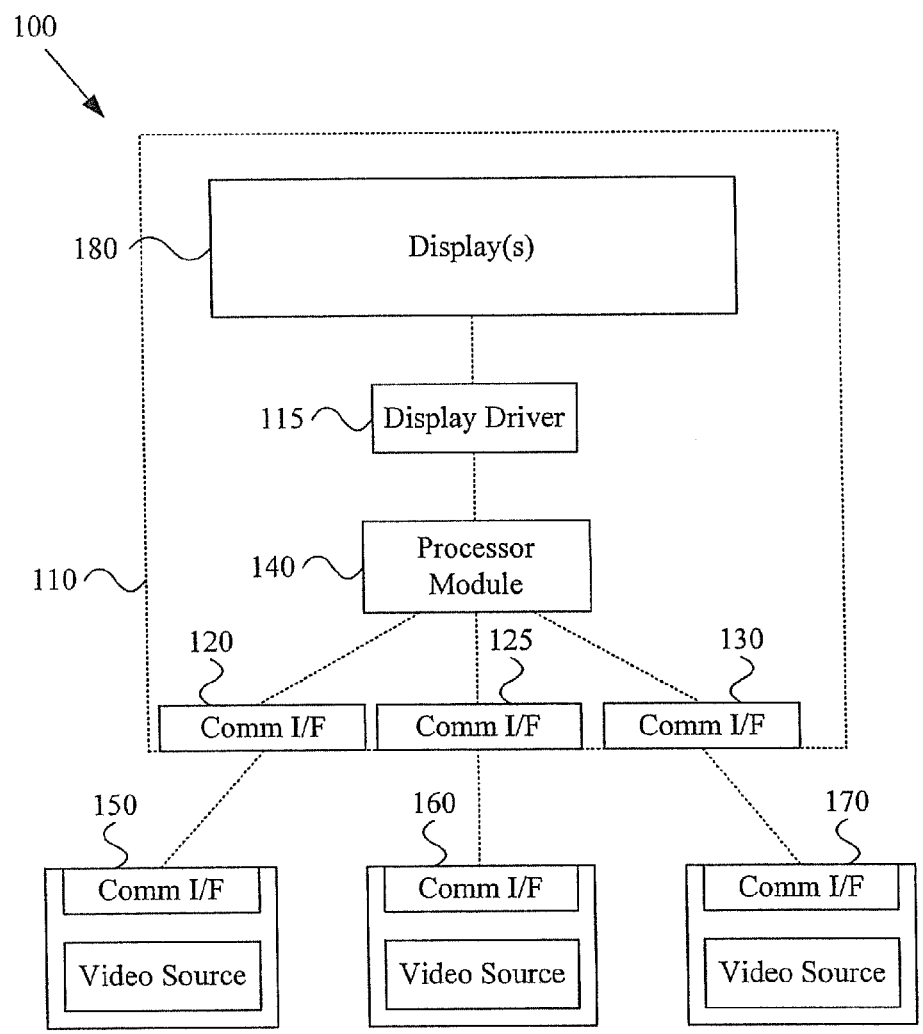
FIG. 1 is a diagram showing an exemplary system comprising a multiple device access windowing display, in accordance with various aspects of the present invention.

FIG. 1 is a diagram showing an exemplary system 100 comprising an exemplary multiple device access windowing display, in accordance with various aspects of the present invention. The exemplary system 100 may comprise an exemplary display system 110, first video source 150, second video source 160 and third video source 170.

The exemplary display system 110 may, for example, comprise a first data communication interface 120, second data communication interface 125 and third data communication interface 130. The display system 110 may; for example, comprise a processor module 140 and an output display driver 115. The exemplary display system 110 may also, for example, comprise one or more video display devices 180. Note however, that the various components of the exemplary display system 110 need not be grouped as a single physical entity or in any particular physical arrangement.

The first data communication interface 120 may, for example, be communicatively coupled to the first video source 150. The first video source 150 may, for example, comprise an internal video source coupled to a data communication interface. The data communication interface of the first video source 150 may, for example, communicate a first video data signal to the first data communication interface 120 of the display system 110. The first video data signal may correspond to a first video image (static or dynamic).

For example and without limitation, the data communication interface of the first video source 150 may comprise general data communication circuitry. Such data communication circuitry may, for example and without limitation, share various characteristics with data communication circuitry found on any of a large variety of data communication cards and network interface cards. Additional exemplary characteristics regarding the first video source 150 will be provided in the following discussion of the exemplary system 200 of FIG. 2.

The first video data signal may, for example, comprise characteristics of any of a large number of standard and proprietary data communication signal types. Such characteristics may, for example, comprise media characteristics (e.g., wired, wireless RF, tethered optical, non-tethered optical, etc.). Such characteristics may also, for example, comprise protocol characteristics (e.g., Ethernet, token ring, IEEE 802.11, Bluetooth, Ultra Wideband, etc.). Such characteristics may further, for example, comprise modulation characteristics (e.g., QPSK, QAM, nQAM, etc.). Such characteristics may, for example, comprise encoding characteristics (e.g., MPEG, JPEG, WMV, etc.). Such characteristics may, for example, also comprise encryption characteristics (e.g., public key, private key, symmetric, asymmetric, frequency hopping, etc.). Accordingly, the scope of various aspects of the present invention should not be limited by particular characteristics of a video data signal.

Various characteristics of the first video data signal communicated between the first video source 150 and the first data communication interface 120 may depend on aspects of the display system 110. For example, upon establishment of a communication link between the first video source 150 and the first data communication interface 120, the first video source 150 may handshake with the first data communication interface 120 to determine various characteristics of the communication link. Such characteristics may, for example, comprise data rate, modulation type, error detection/correction strategy, encoding type, secure communication measures, etc. Alternatively, for example, in an exemplary scenario where the first video source 150 is only capable of one type of video data communication, various characteristics of the video data signal communicated between the first video source 150 and the first data communication interface 120 may be fixed.

The exemplary display system 110 may comprise a second data communication interface 125. The second data communication interface 125 may, for example, comprise any of the exemplary characteristics discussed previously with regard to the first data communication interface 120. It should be emphasized, however, that the second data communication interface 125 need not be identical to the first data communication interface 120. For example and without limitation, the first data communication interface 120 may comprise an IEEE 802.11 wireless interface, while the second data communication interface 125 may comprise a wired Ethernet interface.

Similarly, the second video source 160 may, for example, comprise any of the exemplary characteristics discussed previously with regard to the first video source 150 discussed previously. Also, the communication link between the second data communication interface 125 and the second video source 160 may, for example, comprise any of the exemplary characteristics discussed previously with regard to the communication link between the first data communication interface 120 and the first video source 150. Note, however, that the second video source 160 and communication link between the second video source 160 and the second data communication interface 125 need not exhibit the same characteristics as the first video source 150 and communication link between the first video source 150 and the first data communication interface 120.

The exemplary display system 110 may comprise a third data communication interface 130. The third data communication interface 130 may, for example, comprise any of the exemplary characteristics discussed previously with regard to the first data communication interface 120. It should be emphasized, however, that the third data communication interface 130 need not be identical to the first data communication interface 120. For example and without limitation, the first data communication interface 120 may comprise an IEEE 802.15 wireless interface, while the third data communication interface 130 may comprise a wired T1 interface.

Similarly, the third video source 170 may, for example, comprise any of the exemplary characteristics discussed previously with regard to the first video source 150 discussed previously. Also, the communication link between the third data communication interface 130 and the third video source 170 may, for example, comprise any of the exemplary characteristics discussed previously with regard to the communication link between the first data communication interface 120 and the first video source 150 discussed previously. Note, however, that the third video source 170 and communication link between the third video source 170 and the third data communication interface 130 need not exhibit the same characteristics as the first video source 150 and communication link between the first video source 150 and the first data communication interface 120.

The display system 110 may comprise a processor module 140 that generates a video display signal comprising information of a various display windows. For example and without limitation, the processor module 140 may receive first video data from the first data communication interface 120 that is representative of a first video image. Also for example, the processor module 140 may receive second video data from the second data communication interface 125 that is representative of a second video image.

Additionally, for example, the processor module 140 may receive further video data from one or more other video sources (e.g., third video data from the third data communication interface 130, originating from the third video source 170). The following discussion will generally discuss a two-window video display scenario. However, it should be understood that various two-window aspects discussed herein are readily extendible to three-window and n-window video display scenarios.

Note that the following discussion will generally utilize the phrase "video image" to mean static or dynamic video image. That is, a "video image" may comprise a moving picture, static image, frame of a moving picture, paused moving picture, scrolling document view, etc.

The processor module 140 may generate information of a first display window that corresponds to the first video image. For example, the processor module 140 may comprise a first sub-module (e.g., a first window generating sub-module) that generates such information. The processor module 140 may, for example, transform first video data of the first video image to reflect an image of particular spatial dimensions (e.g., by sub-sampling or interpolating). For example, the processor module 140 may fit first video data of the first video image to the spatial dimensions of the first display window, thereby generating first window data.

The processor module 140 may generate information of a second display window that corresponds to the second video image. For example, the processor module 140 may comprise a second sub-module (e.g., a second window generating sub-module) that generates such information. The processor module 140 may, for example, transform second video data of the second video image to reflect an image of particular spatial dimensions (e.g., by sub-sampling or interpolating). For example, the processor module 140 may fit second video data of the second video image to the spatial dimensions of the second display window, thereby generating second window data.

Additionally, for example, the processor module 140 may similarly generate information of a third display window that corresponds to a third video image and/or an nth display window that corresponds to an nth video image.

The dimensions and placement of the first and second (or n) display windows may, for example, be generated automatically (e.g., according to default window characteristic settings) or may be controlled by a user via a window control interface. Aspects of an exemplary window control interface will be discussed later in the discussion of the exemplary system 200 shown in FIG. 2.

The processor module 140 may generate a video display signal comprising information of the first display window and information of the second display window (and additional windows if necessary). For example, the processor module 140 may comprise a third sub-module to perform, such signal generation. Such signal generation may, for example, comprise combining, mixing or overlaying data related to the first and second display windows. The video display signal may generally, for example, correspond to a video display image comprising information of at least a portion of the first display window (and/or related graphics) and at least a portion of the second display window (and/or related graphics).

The processor module 140 may generally generate a video display signal comprising information related to the first display window and information related to the second display window. Accordingly, the scope of various aspects of the present invention should not be limited by characteristics of particular signal or information processing (e.g., signal/information transforming, combining or generating).

The display system 110 may, for example, comprise a graphics generator communicatively coupled to the processor module 140. For example, in an exemplary scenario where the second display window is represented by an icon, the video display signal generated by the processor module 140 may comprise graphical information of the icon instead of, or in addition to, information of the second display window. Also, in an exemplary scenario where the processor module 140 receives information related to a third video (or nth video), the video display signal may comprise information of a third display window (or nth display window).

The processor module 140 may communicate the generated video display signal to the output display driver 115. The output display driver 115 may, for example, comprise any of a variety of display driving circuitry. For example, the output display driver 115 may comprise component video display driving circuitry or composite video display driving circuitry. The output display driver 115 may, for example, comprise one or more display buffers and associated signal processing circuitry. The output display driver 115 may, for example, comprise circuitry characteristic of computer graphics card circuitry, or DVD player display driving circuitry. Accordingly, the scope of various aspects of the present invention should not be limited by characteristics of particular display driving circuitry.

As mentioned previously, the exemplary display system 110 may comprise one or more video display devices 180. Note, however, that the scope of various aspects of the present invention should not be limited by the existence of one or more video display devices 180 or by whether the video display device(s) 180 and other components of the exemplary system 110 are enclosed in the same physical housing. The output display driver 115 may, for example, communicate display driving signals corresponding to the video display signal generated by the processor module 140 to the video display device(s) 180 using any of a variety of media and protocols. Such media may, for example and without limitation, comprise wired, wireless RF, tethered optical, and non-tethered optical communication media. Exemplary protocols and signal types may comprise various composite and component video signals (e.g., a R-G-B signal, a Y-U-V or Y R-Y B-Y signal, a Y-I-Q signal, a Y-C or S-Video signal, a Y-Cr-Cb signal, a Y-Cd1-Cd2 signal, etc.). Accordingly, the scope of various aspects of the present invention should not be limited by characteristics of a particular display driver signal or media type.

The video display device(s) 180 may then generate a video display image corresponding to the video display signal generated by the processor module 140. Such a video display image may, for example, comprise a plurality of windows (e.g., a first window corresponding to the first video image and a second window corresponding to the second video image).

Figure 2:
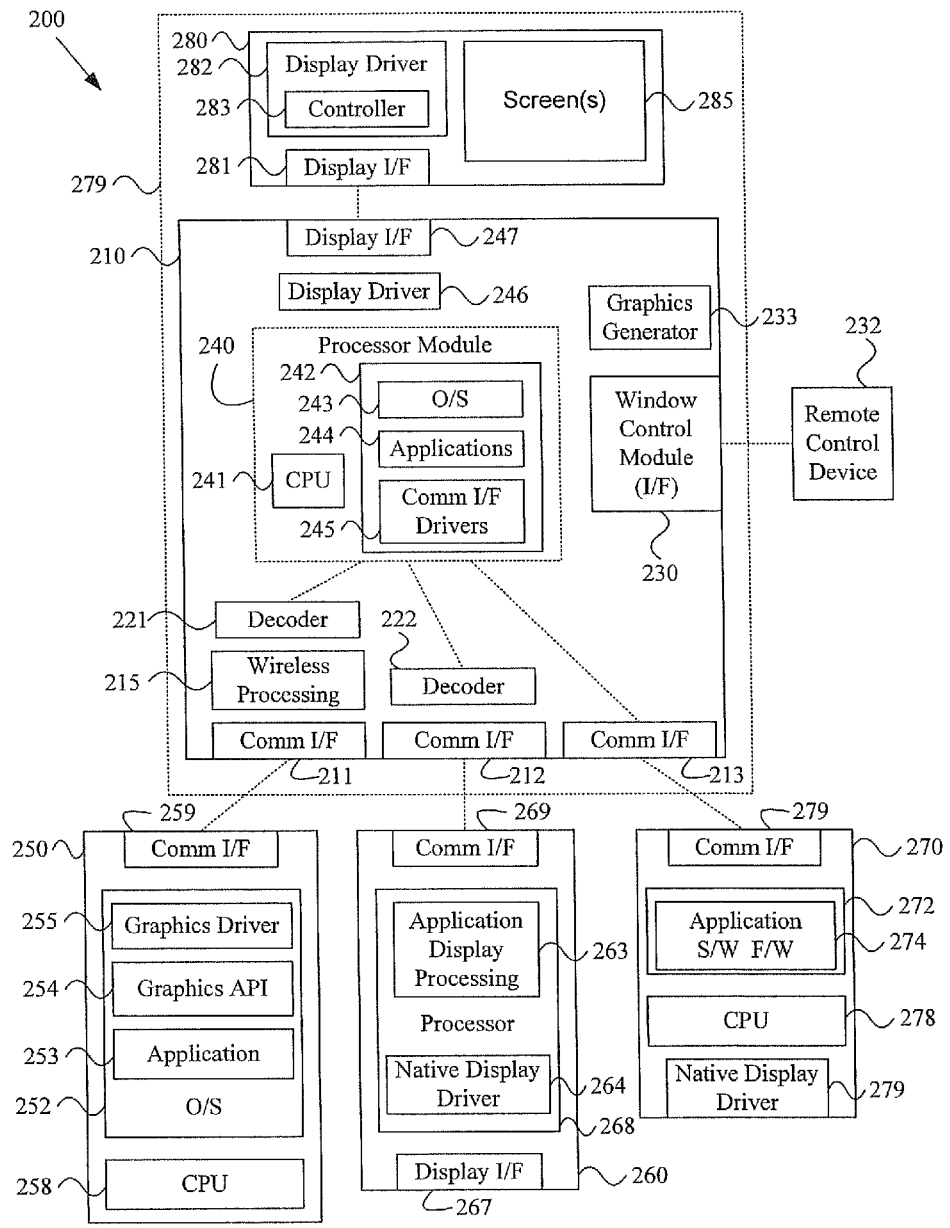
FIG. 2 is a diagram showing an exemplary system comprising a multiple device access windowing display, in accordance with various aspects of the present invention.

FIG. 2 is a diagram showing an exemplary system 200 comprising an exemplary multiple device access windowing display, in accordance with various aspects of the present invention. The exemplary system 200 illustrates various aspects of the present invention not illustrated in the exemplary system 100 shown in FIG. 1, and also provides further examples of various aspects illustrated in the exemplary system 100 shown in FIG. 1 and discussed previously. Accordingly, the scope of various aspects of the present invention should not be limited by characteristics of particular systems or components illustrated in the exemplary system 200 and discussed below.

The exemplary system 200 may comprise an exemplary display system 210, first video source 250, second video source 260 and third video source 270. The exemplary system 200 may also comprise a video display device 280 (or multiple video display devices). Note that the video display device 280 and exemplary display system 210 may, for example, be separate or may be combined into a single unit, as illustrated by box 279.

The exemplary display system 210 may, for example, comprise a first data communication interface 211, second data communication interface 212 and third data communication interface 213. The display system 210 may, for example, comprise a processor module 240 and an output display driver 246. The processor module 240, output display driver 246 and various aspects of the data communication interfaces 211-213 may, for example, be separate or integrated into a single module. Note however, that the various components of the exemplary display system 210 need not be grouped as a single physical entity or in any particular physical arrangement.

The first data communication interface 211 may, for example, be communicatively coupled to the first video source 250. The first video source 250 may, for example, comprise an internal video source coupled to a data communication interface 259. The internal video source may, for example, comprise a central processing unit ("CPU") 258 operating according to hardware and software or firmware instructions. For example, the first video source 250 may comprise a variety of hardware components (including memory) and operating instructions, including an operating system ("O/S") 252, one or more applications 253, a graphics application program interface ("API") 254, and graphics driver 255. For example and without limitation, the CPU 258 may execute the application(s) 253, which in turn invokes various graphics API 254 routines, which in turn drive functionality in the graphics driver 255. The graphics driver 255 may then communicate video information with the data communication interface 259 of the first video source 250.

The data communication interface 259 of the first video source 250 may, for example, communicate a first video data signal to the first data communication interface 211 of the display system 210. The first video data signal may correspond to a first video image (static or dynamic). The data communication interface 259 of the first video source 250 may, for example, comprise general data communication circuitry. Such data communication circuitry may, for example and without limitation, share various characteristics with data communication circuitry found on any of a large variety of data communication cards and network interface cards.

The first video data signal may, for example, comprise characteristics of any of a large number of standard and proprietary data communication signal types. Such characteristics may, for example, comprise media characteristics (e.g., wired, wireless RF, tethered optical, non-tethered optical, etc.). Such characteristics may also, for example, comprise protocol characteristics (e.g., Ethernet, token ring, IEEE 802.11, Bluetooth, Ultra Wideband, etc.). Such characteristics may further, for example, comprise modulation characteristics (e.g., QPSK, QAM, nQAM, etc.). Such characteristics may, for example, comprise encoding characteristics (e.g., MPEG, JPEG, WMV, etc.). Such characteristics may, for example, also comprise encryption characteristics (e.g., public key, private key, symmetric, asymmetric, frequency hopping, etc.). Accordingly, the scope of various aspects of the present invention should not be limited by particular characteristics of a video data signal.

Various characteristics of the first video data signal communicated between the first video source 250 and the first data communication interface 211 may depend on aspects of the display system 210. For example, upon establishment of a communication link between the first video source 250 and the first data communication interface 211, the first video source 250 may handshake with the first data communication interface 211 to determine various characteristics of the communication link. Such characteristics may, for example, comprise data rate, modulation type, error detection/correction strategy, encoding type, secure communication measures, etc. Alternatively, for example, in an exemplary scenario where the first video source 250 is only capable of one type of video data communication, various characteristics of the video data signal communicated between the first video source 250 and the first data communication interface 211 may be fixed.

The exemplary display system 210 may comprise a second data communication interface 212. The second data communication interface 212 may, for example, comprise any of the exemplary characteristics discussed previously with regard to the first data communication interface 211. It should be emphasized, however, that the second data communication interface 212 need not be identical to the first data communication interface 211. For example and without limitation, the first data communication interface 211 may comprise an interface based on the wireless IEEE 802.11 standard, while the second data communication interface 212 may comprise an interface based on a wired Ethernet standard. Similarly, the second video source 260 may, for example, comprise any of the exemplary characteristics discussed previously with regard to the first video source 250.

As illustrated in FIG. 2, the second data communication interface 212 may, for example, be communicatively coupled to the second video source 260. The second video source 260 may, for example, comprise an internal video source coupled to a data communication interface 269. The internal video source of the second video source 260 may, for example, comprise a processor 268 operating according to hardware and software or firmware instructions. For example and without limitation, the processor 268 may execute instructions to generate video information. The processor 268 may, for example, execute a display processing application 263, which in turn may interface with the data communication interface 269 to generate a second video data signal.

The communication link between the second data communication interface 212 and the data communication interface 269 of the second video source 260 may, for example, comprise any of the exemplary characteristics discussed previously with regard to the communication link between the first data communication interface 211 and the first video source 250. Note, however, that the second video source 260 and communication link between the second video source 260 and the second data communication interface 212 need not exhibit the same characteristics as the first video source 250 and communication link between the first video source 250 and the first data communication interface 211.

The exemplary display system 210 may comprise a third data communication interface 213. The third data communication interface 213 may, for example, comprise any of the exemplary characteristics discussed previously with regard to the first and second data communication interfaces 211-212. It should be emphasized, however, that the third data communication interface 213 need not be identical to either of the first or second data communication interfaces 211-212. For example and without limitation, the first data communication interface 211 may comprise an interface based on IEEE 802.15, the second data communication interface 212 may comprise an interface based on T1, and the third data communication interface 213 may comprise an interface based on Ethernet. Similarly, the third video source 270 may, for example, comprise any of the exemplary characteristics discussed previously with regard to the first and second video sources 250, 260 discussed previously.

As illustrated in FIG. 2, the third data communication interface 213 may, for example, be communicatively coupled to the third video source 270. The third video source 270 may, for example, comprise an internal video source coupled to a data communication interface 279. The internal video source of the third video source 270 may, for example, comprise a CPU 278 operating according to an embedded application 274 and embedded boot code instructions 272. For example and without limitation, the CPU 278 may execute the embedded boot code instructions 272 and application instructions 274, which in turn may generate video information and drive the data communication interface 279 to generate a third video data signal.

The communication link between the third data communication interface 213 and the third video source 270 may, for example, comprise any of the exemplary characteristics discussed previously with regard to the communication links between the first data communication interface 211 and the first video source 250 and between the second data communication interface 212 and the second video source 260. Note, however, that the third video source 270 and communication link between the third video source 270 and the third data communication interface 213 need not exhibit the same characteristics as the first video source 250, second video source 260 and respective communication links with the first data communication interface 211 and the second data communication interface 212.

As mentioned previously, the communication interface between the first data communication interface 211 of the display system 210 and the data communication interface 259 of the first video source 250 may comprise a wireless communication link (e.g., an RF or non-tethered optical communication link). The second 212 and third 213 data communication interfaces may also comprise such a link. The exemplary display system 210, as illustrated in FIG. 2, comprises a wireless processing module 215 communicatively coupled to the first data communication interface 211. The wireless processing module 215 may, for example, perform wireless communication link processing in the event that a communication link with the first data communication interface 211 is based on wireless technology.

The exemplary display system 210 may also, for example, comprise respective decoding modules 221-222 corresponding to some or all of the data communication interfaces 211-212. For example, the decoding modules 221-222 may provide general data detecting, decoding and processing functionality associated with respective video data signals received by the respective data communication interfaces 211-212. Note, however, that the scope of various aspects of the present invention should not be limited by the existence of, or characteristics of, particular signal decoding functionality or apparatus.

The display system 210 may comprise a processor module 240 that generates a video display signal comprising information received from a plurality of data communication interfaces. For example and without limitation, the processor module 240 may receive first video data from the first data communication interface 211 (and/or associated signal processing modules) that is representative of a first video image from the first video source 250. Also for example, the processor module 240 may receive second video data from the second data communication interface 212 (and/or associated signal processing modules) that is representative of a second video image from the second video source 260. Additionally, for example, the processor module 240 may receive third video data from the third data communication interface 213 (and/or associated signal processing modules) that is representative of a third video image from the third video source 270.

Additionally, for example, the processor module 240 may receive further video data from one or more other video sources (e.g., an nth video data signal from an nth data communication interface, originating from an nth video source). The following discussion will generally discuss a three-window video display scenario. However, it should be understood that various three-window aspects discussed herein are readily extendible to n-window video display scenarios.

The processor module 240 may generate information of a first display window that corresponds to the first video image from the first video source 250. For example, the processor module 240 may comprise a first sub-module (e.g., a first window generating sub-module) that generates such information. For example, the processor module 240 may transform first video data of the first video image to reflect an image of particular spatial dimensions (e.g., by sub-sampling or interpolating). For example, the processor module 240 may fit first video data of the first video image to the spatial dimensions of the first display window.

The processor module 240 may generate information of a second display window that corresponds to the second video image from the second video source 260. For example, the processor module 240 may comprise a second sub-module (e.g., a second window generating sub-module) that generates such information. For example, the processor module 240 may transform second video data of the second video image to reflect an image of particular spatial dimensions (e.g., by sub-sampling or interpolating). For example, the processor module 240 may fit second video data of the second video image to the spatial dimensions of the second display window.

The processor module 240 may generate information of a third display window that corresponds to the third video image from the third video source 270. For example, the processor module 240 may comprise a third sub-module (e.g., a third window generating sub-module) that generates such information. For example, the processor module 240 may transform third video data of the third video image to reflect an image of particular spatial dimensions (e.g., by sub-sampling or interpolating). For example, the processor module 240 may fit third video data of the third video image to the spatial dimensions of the third display window. Additionally, for example, the processor module 240 may similarly generate infatuation of an nth display window that corresponds to an nth video image.

The dimensions of the first, second and third (or nth) display windows may, for example, be generated automatically (e.g., according to default window dimension settings) or may be controlled by a user via a window control interface. The exemplary display system 210 may comprise a control module 230 (e.g., a window control module) that receives window control information. The window control module 230 may provide such window control information to the processor module 240 or other module of the exemplary system 210. Such window control information may, for example, comprise information of window spatial characteristics. Such spatial characteristics may, for example, comprise window dimension information and window placement information. The window control information may also, for example, comprise information related to maximizing and minimizing windows, window layering, and reducing windows to icons and vice versa.

The exemplary system 200 illustrates a remote control device 232 that is communicatively coupled to the window control module 230. A user may, for example, utilize such a remote control device 232, or alternatively a control feature coupled to a component of the display system 210 or a video source device 250, 260, 270 to communicate window control information to the display system 210. In an exemplary scenario, a user may enter a window sizing command with the remote control device 232, which the window control module 230 receives and processes. The window control module 230 may then communicate information of the exemplary window sizing command to the processor module 240.

In general, the window control module 230 may receive a window control signal and determine spatial and other characteristics of a window based on such a window control signal. Accordingly, the scope of various aspects of the present invention should not be limited by characteristics of a particular window control processing method, a window control signal interface, or a particular apparatus utilized by a user or system to generate and communicate a window control signal. For example and without limitation, the window control module 230 may be configured to receive window control signals from any of the data communication interfaces 211-213. In an exemplary scenario, the window control module 230 may receive window control information from the first video source 250 through the first data communication interface 211.

The processor module 240 may generate a video display signal comprising information of the first display window, information of the second display window and information of the third display window (and additional windows if necessary). For example, the processor module 240 may comprise a fourth sub-module to perform such signal generation. Such signal generation may, for example, comprise combining or mixing data related to the first, second and third display windows. The video display signal may generally, for example, correspond to a video display image comprising information of at least a portion of the first display window (and/or related graphics), at least a portion of the second display window (and/or related graphics), and at least a portion of the third display window (and/or related graphics).

The exemplary processor module 240 illustrated in FIG. 2 comprises a CPU 241 and a memory module 242. The memory module 242 may, for example, store processing instructions related to an operating system 243, one or more applications 244 and communication drivers 245 for communicating with the various data communication interfaces 211-213 and related components. The CPU 241 may, for example, execute application 244 and/or operating system 243 instructions to generate the video display signal output from the processor module 240.

For example and without limitation, the memory module 242 (e.g., comprising the O/S 243, application(s) 244, or communication drivers 245) may comprise processing instructions for generalized communication of video data or customized communication of video data. By way of example, the memory module 242 may comprise processing instructions customized for communicating video information between the processor module 240 and a particular application 274 that the CPU 278 of the third video source 270 is executing to generate the third video image. For example, the processor module 240 and a video source may have such compatible applications. Also by way of example, the memory module 242 may comprise processing instructions customized for communicating video information between the processor module 240 and the graphics driver 255 of the first video source 250. Further by way of example, the memory module 242 may comprise processing instructions generalized for communicating data between the processor module 240 and any generic device communicatively coupled thereto. Accordingly, the scope of various aspects of the present invention should not be limited by characteristics of particular generalized or customized instructions that the processor module 240 may execute.

The processor module 240 may generally generate a video display signal comprising information related to the first, second and third display windows. Accordingly, the scope of various aspects of the present invention should not be limited by characteristics of particular signal or information processing (e.g., signal/information transforming, combining or generating).

The video system 210 may, for example, comprise a graphics generator 233 communicatively coupled to the processor module 240. For example, in an exemplary scenario where the second window is represented by an icon, the graphics generator 233 may communicate icon graphic information to the processor module 240. The processor module 240 may then, for example, incorporate such icon graphic information into the video display signal output from the processor module 240.

Also for example, the graphics generator 233 may also generate other graphical components related to the windows, including but not limited to window framing graphics, window control graphics, and cursor graphics. The graphics generator 233 may communicate such graphical information to the processor module 240, which may then incorporate such graphical information into the video display signal output from the processor module 240. In general, the graphics generator 233 may generate graphical information corresponding to a variety of video graphics that the processor module 240 may incorporate into (or overlay on) the video display signal output from the processor module 240. Accordingly, the scope of various aspects of the present invention should not be limited by characteristics of particular graphics or particular apparatus or methods for generating and utilizing such graphics.

The processor module 240 may communicate the generated video display signal to the output display driver 246. The output display driver 246 may, for example, comprise any of a variety of display driving circuitry. For example, the output display driver 246 may comprise component video driving circuitry or composite video driving circuitry. The output display driver 246 may, for example, comprise one or more display buffers and associated video signal processing circuitry. The output display driver 246 may, for example, comprise circuitry characteristic of computer graphics card circuitry or DVD player display driver circuitry. Accordingly, the scope of various aspects of the present invention should not be limited by characteristics of particular display driving circuitry.

As mentioned previously, the exemplary video system 210 may comprise one or more video display devices 280. Note, however, that the scope of various aspects of the present invention should not be limited by the existence of one or more video display devices 280 or by whether the video display device(s) 280 and other components of the exemplary system 210 are enclosed in the same physical housing. The video display device(s) 280 may comprise a variety of video display characteristics. For example and without limitation, the video display device(s) 280 may comprise multiple screens or a single screen, an LCD display, a plasma display or a CRT.

The output display driver 246 may, for example, communicate one or more display driver signals corresponding to the video display signal generated by the processor module 240 to the video display device(s) 280 using any of a variety of media and protocols, such as, for example, those discussed previously with regard to the output display driver 115 of the system 100 illustrated in FIG. 1. Accordingly, the scope of various aspects of the present invention should not be limited by characteristics of a particular interface between the output display driver 246 and a video display.

The video display device(s) 280 may receive the display driver signal from the output display driver 246 and generate a video image corresponding to the video display signal generated by the processor module 240. Such a video image may, for example, comprise a video display image comprising a plurality of display windows (e.g., a first display window corresponding to the first video image from the first video source 250, a second display window corresponding to the second video image from the second video source 260, and a third display window corresponding to the third video image from the third video source 270).

The exemplary display device 280 illustrated in FIG. 2 comprises its own display driver 282 and display driver interface 281 circuitry. In the exemplary system 200, the display system 210 comprises an output display driver interface 247, through which the output display driver 246 communicates an output display driver signal to the display 280. The exemplary display 280 comprises a display driver interface 281 through which the display 280 receives the output display driver signal from the output display driver 246 of the display system 210. The exemplary display 280 comprises a display driver 282, including a controller 283 and other support circuitry, which drives the screen 285 to present a visual image to a user.

Note that the illustrated configuration for the display device 280 is exemplary, and accordingly, the scope of various aspects of the present invention should not be limited by characteristics of the exemplary display device 280, nor by characteristics of the communication pathway between the processor module 240 and the display device 280.

Figure 3:
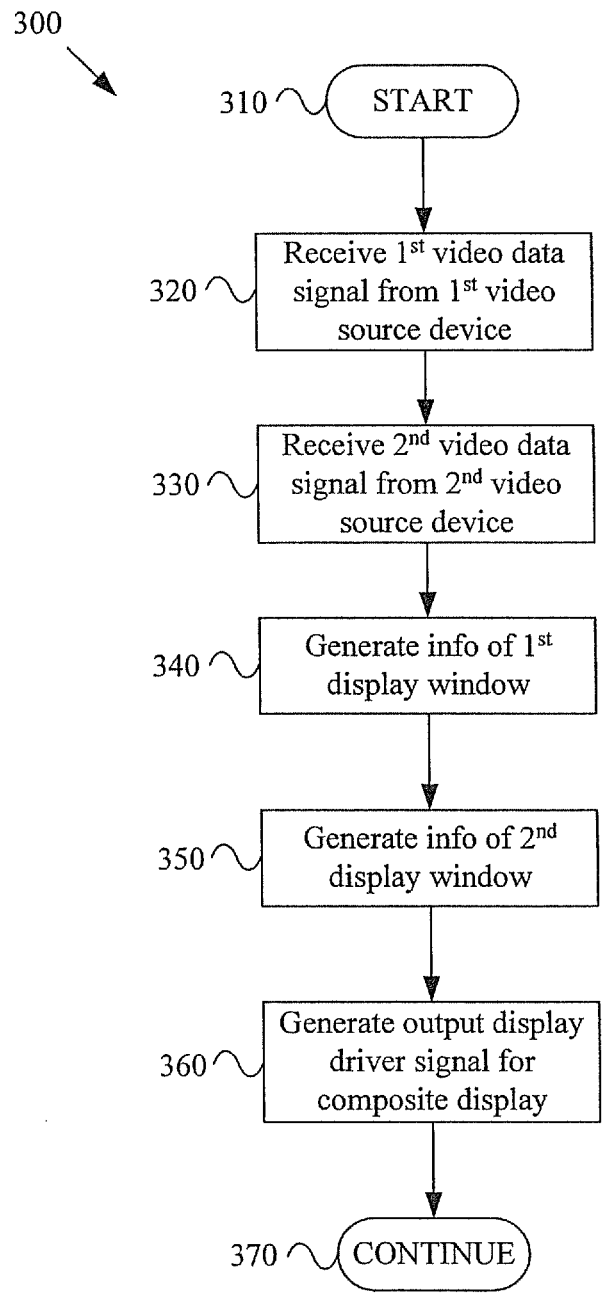
FIG. 3 is a flow diagram illustrating a method for providing a multiple device access windowing display, in accordance with various aspects of the present invention.

FIG. 3 is a flow diagram illustrating a method 300 for providing a multiple device access windowing display, in accordance with various aspects of the present invention. The method 300 begins at step 310. Various events and conditions may cause the method 300 to begin. For example, a user of a video display system or a video source system may request that the video display system display a video image from the video source system. Alternatively, for example, the video display system may be configured to automatically display a video image from a video image source under particular triggering circumstances. Generally, the method 300 may be initiated for a variety of reasons. Accordingly, the scope of various aspects of the present invention should not be limited by characteristics of particular initiating events or conditions.

The method 300, at step 320, may comprise receiving a first video data signal from a first video source device, where the first video data signal corresponds to a first video image (static or dynamic). For example and without limitation, the first video data signal may originate from a first video source device comprising a TV receiver, laser disk player, laptop computer, computer graphics card, video game, personal digital assistant, telephone, etc.

The first video data signal may, for example, comprise characteristics of any of a large number of standard and proprietary data communication signal types. Such characteristics may, for example, comprise media characteristics (e.g., wired, wireless RF, tethered optical, non-tethered optical, etc.). Such characteristics may also, for example, comprise protocol characteristics (e.g., Ethernet, token ring, IEEE 802.11, Bluetooth, Ultra Wideband, etc.). Various protocol characteristics may, for example, comprise characteristics of various general-purpose communication protocols. Such characteristics may further, for example, comprise modulation characteristics (e.g., QPSK, QAM, nQAM, etc.). Such characteristics may, for example, comprise encoding characteristics (e.g., MPEG, JPEG, WMV, etc.). Such characteristics may, for example, also comprise encryption characteristics (e.g., public key, private key, symmetric, asymmetric, frequency hopping, etc.). Accordingly, the scope of various aspects of the present invention should not be limited by particular characteristics of a video data signal.

Various characteristics of the first video data signal received from the first video source device may depend on aspects of the receiving display system. For example, upon establishment of a communication link between the first video source device and the display system, the first video source device may handshake with the display system to determine various characteristics of the communication link. Such characteristics may, for example, comprise data rate, modulation type, error detection/correction strategy, encoding type, secure communication measures, etc. Alternatively, for example, in an exemplary scenario where the first video source device is only capable of one type of video data communication, various characteristics of the video data signal received by the display system from the first video source device may be fixed.

The method 300, at step 330, may comprise receiving a second video data signal from a second video source device. Step 330 may, for example, comprise various aspects of step 320 discussed previously. It should be emphasized, however, that the second video data signal need not be identical in type to the first video data signal received at step 320. For example and without limitation, the first video data signal may comprise video data encoded using MPEG encoding and QAM modulation, and the second video data signal may comprise encrypted video frame data communicated according to the IEEE 802.11 standard.

Additionally, the communication link over which the second video data signal may be received may, for example, comprise any of the exemplary characteristics discussed previously with regard to the communication link over which the first video data signal may be received. Note, however, that the communication link over which the second video data signal is received at step 330 need not exhibit the same characteristics as the communication link over which the first video data signal is received at step 320. Nor do respective sources of the second video data signal and the first video data signal necessarily exhibit the same characteristics.

Though not illustrated in the exemplary method 300, the method 300 may comprise receiving a third (or nth) video data signal. The method 300 generally illustrates the receipt and processing of two video data signals for the sake of clarity. However, various aspects of the present invention are readily extendible to receiving and processing one, two, three or more video data signals. Accordingly, the scope of various aspects of the present invention should not be limited by characteristics of receiving and processing a particular number of video data signals.

The method 300, at step 340, may comprise processing the first video data signal to generate video information of a first display window corresponding to the first video image. As mentioned previously, the first video data signal corresponds to a first video image, and generally, the first video data signal may comprise video data describing the first video image.

Step 340 may, for example, comprise detecting first video data in the first video data signal (received at step 320) and transforming such first video data to fit the first video image to spatial characteristics of the first display window. Step 340 may, for example, comprise decoding video data that has been encoded by the video source device (e.g., according to a video encoding standard, such as MPEG). Step 340 may also, for example, comprise decrypting video data that has been encrypted by the video source device.

For example, step 340 may comprise performing spatial transformation processing of the first video data. Such spatial transformation processing may comprise, for example, image data sub-sampling or interpolating. Such spatial transformation processing may comprise, for example, image translation processing and/or processing image data using general or custom transformation matrix processing.

In general, step 340 may comprise processing the first video data signal to generate video information of the first display window corresponding to the first video image. Accordingly, the scope of various aspects of the present invention should not be limited by characteristics of particular video signal or video data transformation processes.

The method 300, at step 350, may comprise processing the second video data signal to generate video information of a second display window corresponding to the second video image. As mentioned previously, the second video data signal corresponds to a second video image, and generally, the second video data signal may comprise video data describing the second video image. Step 350 may, for example, comprise various aspects of step 340 discussed previously. Note, however, that step 350 may comprise performing processing different than step 340. For example, the second video data signal may comprise a different type of video data signal than the first video data signal.

Step 350 may, for example, comprise detecting second video data in the second video data signal (received at step 330) and transforming such second video data to fit the second video image to spatial characteristics of the second display window. For example, step 350 may comprise performing spatial transformation processing of the second video data. Such spatial transformation processing may comprise, for example, image data sub-sampling or interpolating. Such spatial transformation processing may comprise, for example, image translation processing and/or processing image information using general or custom transformation matrix processing.

In general, step 350 may comprise processing the second video data signal to generate video information of the second display window corresponding to the second video image. Accordingly, the scope of various aspects of the present invention should not be limited by characteristics of particular video signal or video data transformation processes.

The dimensions of the first and second (or n) display windows in steps 340 and 350 may, for example, be generated automatically (e.g., according to default window dimension settings) or may be manually controlled by a user via a window control interface. Such a window control interface may, for example, receive a window control signal from a dedicated control device or from a video source device. Various aspects of the control of various window characteristics will be discussed later in the discussion of the method 400 illustrated in FIG. 4.

The method 300, at step 360, may comprise generating an output display driver signal comprising at least a portion of the video information of the first display window and at least a portion of the video information of the second display window. For example, step 360 may comprise combining at least a portion of the first display window information generated at step 340 with at least a portion of the second display window information generated at step 350 into information of a display image comprising at least a portion of the first video image in the first display window and at least a portion of the second video image in the second display window. Such an output display driver signal may, for example, share various characteristics with the output display driver signals output from the output display drivers 115, 246 shown in FIGS. 1-2 and discussed previously.

Step 360 may, for example, comprise combining or mixing data related to the first and second display windows. Step 360 may, for example, comprise storing display image information in a video buffer. Step 360 may generally comprise generating an output display driver signal comprising at least a portion of the video information of the first display window and at least a portion of the video information of the second display window. Accordingly, the scope of various aspects of the present invention should not be limited by characteristics of particular data combining or multiplexing techniques that may be utilized to combine window images (information and/or signals) into a composite display image comprising aspects of the various window images.

Step 360 may, for example, further comprise incorporating graphics information into the output display driver signal. Such graphics information may, for example, comprise various graphics information related to the first and second display windows. Such graphics information may, for example, comprise window border information, cursor information, scroll bar information, menu information, icon information, etc. For example, in an exemplary scenario, the first and second display windows may be associated with respective icons, and step 360 may comprise incorporating information of the respective icons in addition to (or in place of) information of the first and second display windows in the output display driver signal. Step 360 may, for example, comprise incorporating graphics information, textual information, and other information into the output display driver signal. Accordingly, the scope of various aspects of the present invention should not be limited by characteristics of particular information (graphics or otherwise) additional to window video information that may be incorporated into the output display driver signal.

Step 360 may be implemented in any of a variety of ways. For example, step 360 may be implemented utilizing a processor executing software instructions. For example, a processor (or CPU) may execute software instructions for generalized processing of video data or customized processing of video data. For example, step 360 may be implemented utilizing a processor executing an application that is compatible with a corresponding application being executed in a video source device. In general, step 360 may be implemented utilizing hardware, software, or a combination thereof. Accordingly, the scope of various aspects of the present invention should not be limited by characteristics of a particular implementation of step 360.

The method 300, at step 370, may comprise performing further processing. For example, step 370 may comprise providing the output display driver signal generated at step 360 to one or more display devices. Step 370 may, for example, further comprise repeating various steps of the method 300 until a user directs processing to change or halt.

Figure 4:
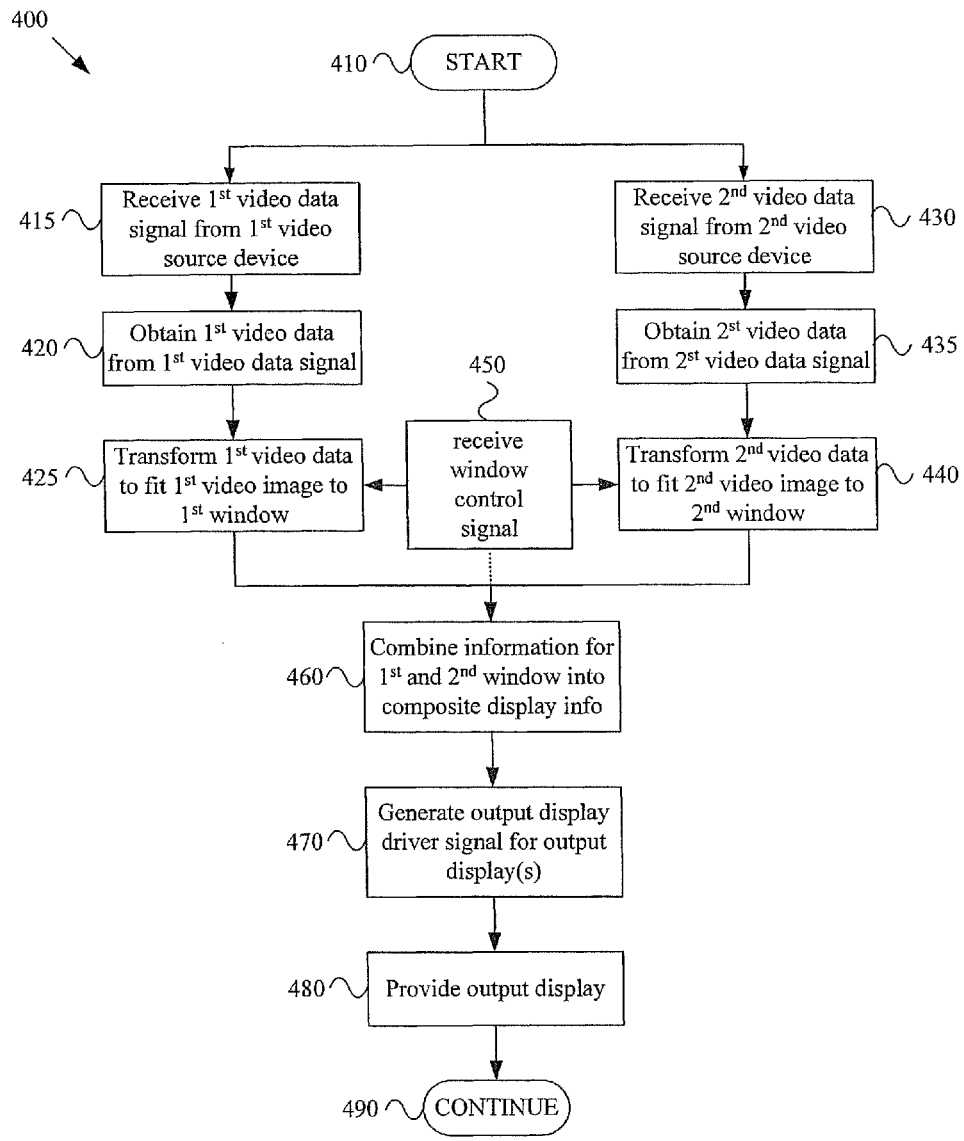
FIG. 4 is a flow diagram illustrating a method for providing a multiple device access windowing display, in accordance with various aspects of the present invention.

FIG. 4 is a flow diagram illustrating an exemplary method 400 for providing a multiple device access windowing display, in accordance with various aspects of the present invention. The exemplary method 400 illustrates various aspects of the present invention not illustrated in the exemplary method 300 shown in FIG. 3, and also provides further examples of various aspects illustrated in the exemplary method 300 shown in FIG. 3 and discussed previously. Accordingly, the scope of various aspects of the present invention should not be limited by characteristics of various method steps illustrated in the exemplary method 400 and discussed below.

The method 400 begins at step 410. Various events and conditions may cause the method 400 to begin. For example, a user of a video display system or a video source system may request that the video display system display a video image from the video source system. Alternatively, for example, the video display system may be configured to automatically display a video image from a video image source under particular triggering circumstances. Generally, the method 400 may be initiated for any of a variety of reasons. Accordingly, the scope of various aspects of the present invention should not be limited by characteristics of particular initiating events and conditions.

The method 400, at step 415, may comprise receiving a first video data signal from a first video source device, where the first video data signal corresponds to a first video image (static or dynamic). For example and without limitation, the first video data signal may originate from a first video source device comprising a TV receiver, laser disk player, laptop computer, computer graphics card, video game, personal digital assistant, paging device, etc.

Step 415 may, for example, share various aspects with step 320 of the method 300 illustrated in FIG. 3 and discussed previously. However, step 415 should by no means be limited to performing the same functionality as step 320.

The first video data signal may, for example, comprise characteristics of any of a large number of standard and proprietary data communication signal types. Such characteristics may, for example, comprise media characteristics (e.g., wired, wireless RF, tethered optical, non-tethered optical, etc.). Such characteristics may also, for example, comprise protocol characteristics (e.g., Ethernet, token ring, IEEE 802.11, Bluetooth, UltraWideband, etc.). Various protocol characteristics may, for example, comprise characteristics of various general-purpose communication protocols. Such characteristics may further, for example, comprise modulation characteristics (e.g., QPSK, QAM, nQAM, etc.). Such characteristics may, for example, comprise encoding characteristics (e.g., MPEG, JPEG, WMV, etc.). Such characteristics may, for example, also comprise encryption characteristics (e.g., public key, private key, symmetric, asymmetric, frequency hopping, etc.). Accordingly, the scope of various aspects of the present invention should not be limited by particular characteristics of a video data signal.

Various characteristics of the first video data signal received from the first video source device may depend on aspects of the receiving display system. For example, upon establishment of a communication link between the first video source device and the display system, the first video source device may handshake with the display system to determine various characteristics of the communication link. Such characteristics may, for example, comprise data rate, modulation type, error detection/correction strategy, encoding type, secure communication measures, etc. Alternatively, for example, in an exemplary scenario where the first video source is only capable of one type of video data communication, various characteristics of the video data signal received by the display system from the first video source may be fixed.

The method 400, at step 430, may comprise receiving a second video data signal from a second video source device. Step 430 may, for example, share various aspects with step 415 discussed previously and with step 330 of the method 300 illustrated in FIG. 3 and discussed previously. It should be emphasized, however, that the second video data signal need not be identical in type to the first video data signal received at step 415. For example and without limitation, the first video data signal may comprise video data encrypted and communicated over an IEEE 802.11 interface, while the second video data signal may comprise video data encoded and communicated according to the MPEG-4 standard over an optical system.

Additionally, the communication link over which the second video data signal may be received may, for example, comprise any of the exemplary characteristics discussed previously with regard to the communication link over which the first video data signal may be received. Note, however, that the communication link over which the second video data signal is received at step 430 need not exhibit the same characteristics as the communication link over which the first video data signal is received at step 415. Nor do respective sources of the second video data signal and the first video data signal necessarily exhibit the same characteristics.

Though not illustrated in the exemplary method 400, the method 400 may comprise receiving a third (or nth) video data signal. The method 400 generally illustrates the receipt and processing of two video data signals for the sake of clarity, however, various aspects of the present invention are readily extendible to receiving and processing one, two, three or more video data signals. Accordingly, the scope of various aspects of the present invention should not be limited by characteristics of receiving and processing a particular number of video data signals.

The method 400, at step 420, may comprise processing the first video data signal to generate (or determine) video information (or data) of the first video image. As mentioned previously, the first video data signal corresponds to a first video image, and generally, the first video data signal may comprise first video data describing the first video image.

Step 420 may, for example, comprise decoding video data that has been encoded by the first video source device (e.g., according to a video encoding standard, such as MPEG). Step 420 may also, for example, comprise decrypting video data that has been encrypted by the first video source device. Step 420 may generally comprise determining (or obtaining) video information (or data) in the first video data signal corresponding to the first video image. Accordingly, the scope of various aspects of the present invention should not be limited by characteristics of particular data (or information) detection techniques or processing.

The method, at step 425, may comprise processing the first video data determined at step 420 to generate video information of a first display window. For example, step 425 may comprise transforming the first video data to fit spatial characteristics of the first display window. For example, step 425 may comprise performing spatial transformation processing of the first video data. Such spatial transformation processing may comprise, for example, image data sub-sampling or interpolating. Such spatial transformation processing may comprise, for example, image translation processing and/or processing image information using general or custom transformation matrix processing.

In general, step 425 may comprise processing the first video data to generate video information of a first display window corresponding to the first video image. Accordingly, the scope of various aspects of the present invention should not be limited by characteristics of particular video signal or video data transformation processes.

Steps 420 and 425 may, for example share various aspects with step 340 of the method 300 illustrated in FIG. 3 and discussed previously. However, steps 420 and 425 should by no means be limited to performing the same functionality as step 340.

The method 400, at step 435, may comprise processing the second video display signal to generate (or determine) video information (or data) of the second video image. Step 435 may, for example, share various aspects with step 420 discussed previously. However, step 435 should by no means be limited to performing the same functionality as step 420.

As mentioned previously, the second video data signal corresponds to a second video image, and generally, the second video data signal may comprise second video data describing the second video image. Step 435 may, for example, comprise detecting digital video information (or data) in the second video data signal. Step 435 may, for example, comprise decoding video data that has been encoded by the second video source device (e.g., according to a video encoding standard, such as MPEG). Step 435 may also, for example, comprise decrypting video data that has been encoded by the second video source device.

Step 435 may generally comprise determining (or obtaining) video information (or data) in the second video data signal corresponding to the second video image. Accordingly, the scope of various aspects of the present invention should not be limited by characteristics of particular data (or information) detection techniques or processing.

The method, at step 440, may comprise processing the second video data determined at step 435 to generate video information of a second display window. Step 440 may, for example, share various aspects with step 425 discussed previously. However, step 440 should by no means be limited to performing the same functionality as step 425.

For example, step 440 may comprise transforming the second video data to fit spatial characteristics of the second display window. For example, step 440 may comprise performing spatial transformation processing of the second video data. Such spatial transformation processing may comprise, for example, image data sub-sampling or interpolating. Such spatial transformation processing may comprise, for example, image translation processing and/or processing image information using general or custom transformation matrix processing.

In general, step 440 may comprise processing the second video data to generate video information of a second display window corresponding to the second video image. Accordingly, the scope of various aspects of the present invention should not be limited by characteristics of particular video signal or video data transformation processes.

Steps 435 and 440 may, for example share various aspects with step 350 of the method 300 illustrated in FIG. 3 and discussed previously. However, steps 435 and 440 should by no means be limited to performing the same functionality as step 350.

The method, at step 450, may comprise receiving a window control signal. Such a window control signal may, for example, be internally generated by the display system (e.g., by default or in response to various conditions) or may be externally generated (e.g., by a user using a window control device or by a video source device). In an exemplary scenario, the first time a display system generates a display window corresponding to a video image, the corresponding display window may have default characteristics. Then a user may, for example, command the display system to modify the display window characteristics using a control device.

A window control signal may, for example, comprise information controlling various aspects of one or more display windows. For example, a window control signal may comprise information of window type, window size, window placement, window maximization/minimization status, window tiling, window priority, etc. Steps 425 and 440 may, for example, utilize information in a window control signal to determine various aspects of the first and second display windows. Step 460, discussed below, may also utilize information provided in such a window control signal.

In general, step 450 may comprise receiving a window control signal. Accordingly, the scope of various aspects of the present invention should not be limited by characteristics of a particular window control signal or source thereof.

The method 400, at step 460, may comprise combining information for the first and second display windows (or n display windows) into information of a composite video display image, where the video display image comprises information of at least a portion of the first display window (and/or related graphics) and information of at least a portion of the second display window (and/or related graphics). For example, step 460 may comprise combining (or mixing or overlaying) at least a portion of the first display window information generated at step 425 with at least a portion of the second display window information generated at step 440 into information of a video display image comprising at least a portion of the first display window and at least a portion of the second display window. Step 460 may, for example, comprise placing such display image information in a video buffer.

Step 460 may, for example, generally comprise combining information of the first and second display windows into information of a composite video display image. Accordingly, the scope of various aspects of the present invention should not be limited by characteristics of particular processing or combining techniques that may be utilized to combine window images (information and/or signals) into a composite video display image comprising aspects of the various window images.

Step 460 may, for example, further comprise incorporating graphics information into the video display image information. Such graphics information may, for example, comprise various graphics information related to the first and second display windows. Such graphics information may, for example, comprise window border information, cursor information, scroll bar information, menu information, icon information, etc. For example, in an exemplary scenario, the first and second display windows may be associated with respective icons, and step 460 may comprise incorporating information of the respective icons in addition to (or in place of) information of the first and second display windows in the video display image information. Step 460 may, for example, comprise incorporating graphics information, textual information, and other information into the video display image information. Accordingly, the scope of various aspects of the present invention should not be limited by characteristics of particular data combining or multiplexing techniques that may be utilized to combine window images (information and/or signals) into a composite display image comprising aspects of the various window images.

The method 400, at step 470, may comprise generating an output display driver signal representative of the video display image information formed at step 460. Such an output display driver signal may, for example, share various characteristics with the output display driver signals output from the output display drivers 115, 246 shown in FIGS. 1-2 and discussed previously. Such an output display driver signal may, for example, comprise a display driver signal in accordance with any of a variety of standard or proprietary protocols. Accordingly, the scope of various aspects of the present invention should not be limited by characteristics of a particular display driver signal type.

Steps 460 and 470 may, for example, share various aspects with step 360 of the method 300 illustrated in FIG. 3 and discussed previously. However, steps 460 and 470 should by no means be limited to performing the same functionality as step 360.

The method 400, at step 480, may comprise driving one or more output displays with the output display driver signal generated at step 470. Such an output display may, for example, comprise a standard video display. Such an output display may, for example, comprise a single screen or multi-screen display. Such an output display may, for example, share various aspects of the display devices 180, 280 discussed previously with regard to the exemplary systems 100, 200 illustrated in FIGS. 1-2 and discussed previously. Such an output display may comprise any of a large number of display characteristics, and accordingly, the scope of various aspects of the present invention should not be limited by characteristics of a particular display or way of displaying video information.

The method 400, at step 490, may comprise performing further processing. For example, step 490 may comprise repeating various steps of the method 400 until a user directs processing to change or halt. Step 490 may, for example, comprise modifying aspects of an output display image in response to various changing conditions and circumstances.

The method steps discussed previously for the methods 300, 400 illustrated in FIGS. 3-4 may be implemented in any of a variety of ways. For example, various steps may be implemented in hardware, software, or a combination thereof. Further, various steps may be implemented by hardware or software modules in various stages of integration. Accordingly, the scope of various aspects of the present invention should not be limited by characteristics of a particular implementation of any of the method steps discussed herein.

In summary, aspects of the present invention provide a system and method for providing access to a video display for multiple devices. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to any particular embodiment disclosed, but that the invention will include all embodiments falling within the scope of the appended claims.

What is claimed is:

1. A video display sub-system for use in a video display system having at least one output display driver and at least one data communication interface, the video display sub-system comprising: at least one module operable to, at least: communicatively couple to the at least one output display driver and the at least one data communication interface; receive first video data from the at least one data communication interface, the first video data corresponding to a first video image and received by the at least one data communication interface from a first wireless device; receive second video data from the at least one data communication interface, the second video data corresponding to a second video image and received by the at least one data communication interface from a second wireless device; generate a video display signal comprising information of a first display window corresponding to the first video image and information of a second display window corresponding to the second video image; and communicate the generated video display signal to the at least one output display driver.

2. The sub-system of claim 1, wherein the at least one data communication interface from which the first video data is received comprises a general-purpose data communication interface.

3. The sub-system of claim 1, wherein the at least one module is operable to assign variable display coordinates to the first display window and the second display window.

4. The sub-system of claim 1, wherein the at least one module comprises a processor that executes software instructions to generate the video display signal.

5. The sub-system of claim 1, further comprising a control signal interface communicatively coupled to the at least one module that is operable to wirelessly receive a window control signal and communicate window control information to the at least one module.

6. The sub-system of claim 5, wherein the at least one module is operable to respond to the window control information by modifying spatial characteristics one or more of the first and/or second display windows.

7. The sub-system of claim 1, wherein the at least one module comprises a memory module comprising software instructions customized for communicating video information with a first particular software application executable by a first video source device that is communicatively coupled to the at least one data communication interface.

8. The sub-system of claim 1, further comprising a graphics generator that generates first graphics information associated with graphical features of the first display window and second graphics information associated with graphical features of the second display window, and wherein the information of a first display window corresponding to the first video image comprises the first graphics information and the information of a second display window corresponding to the second video image comprises the second graphics information.

9. The sub-system of claim 1, wherein the at least one module is integrated into a single integrated circuit.

10. The sub-system of claim 1, wherein the at least one module is operable to generate the video display signal by, at least in part, sub-sampling the first video data and second video data.

11. In a sub-system of a video display system having at least one output display driver and at least one data communication interface, a method for providing multiple device access to a display, the method comprising: receiving first video data from the at least one data communication interface, the first video data corresponding to a first video image and received by the at least one data communication interface from a first wireless device; receiving second video data from the at least one data communication interface, the second video data corresponding to a second video image and received by the at least one data communication interface from a second wireless device; generating a video display signal comprising information of a first display window corresponding to the first video image and information of a second display window corresponding to the second video image; and communicating the generated video display signal to the at least one output display driver.

12. The method of claim 11, wherein the first video data is received by the at least one data communication interface from the first wireless device utilizing a general-purpose wireless data communication protocol.

13. The method of claim 11, comprising assigning variable display coordinates to the first display window and the second display window.

14. The method of claim 11, wherein said generating the video display signal comprises executing software instructions to generate the output display driver signal.

15. The method of claim 11, comprising wirelessly receiving a window control signal.

16. The method of claim 15, comprising responding to the received window control signal by modifying spatial characteristics of one or more of the first and/or second display windows.

17. The method of claim 15, wherein said wireless receiving a window control signal comprises wirelessly receiving a window control signal for the first display window from the first wireless device.

18. The method of claim 11, wherein said generating a video display signal comprises executing instructions customized for communicating video information with a first particular application executable by the first wireless device to generate the video display signal.

19. The method of claim 11, wherein said generating a video display signal comprises generating first graphics information associated with graphical features of the first display window and generating second graphics information associated with graphical features of the second display window.

20. The method of claim 11, wherein generating an output display driver signal comprises generating the output display driver signal by, at least in part, sub-sampling the first and second video information.

* * * * *